United States Patent
Schoonderbeek et al.

(10) Patent No.: US 10,787,299 B2
(45) Date of Patent: Sep. 29, 2020

(54) POUCH ASSEMBLY FOR HOLDING AN AQUEOUS UREA SOLUTION FOR USE IN AN SCR SYSTEM FOR TREATING THE EXHAUST GASES OF AN INTERNAL COMBUSTION ENGINE OF A VEHICLE AND SYSTEM FOR TREATING THE EXHAUST GASES OF AN INTERNAL COMBUSTION ENGINE OF A VEHICLE USING THE AQUEOUS UREA SOLUTION

(71) Applicant: YARA INTERNATIONAL ASA, Oslo (NO)

(72) Inventors: Jeroen Schoonderbeek, Lasne (BE); Sigurd Jørgensen, Oslo (NO)

(73) Assignee: Yara International ASA, Oslo (NO)

( * ) Notice: Subject to any disclaimer, the term of this patent is extended or adjusted under 35 U.S.C. 154(b) by 46 days.

(21) Appl. No.: 16/070,004

(22) PCT Filed: Feb. 3, 2017

(86) PCT No.: PCT/EP2017/052465
§ 371 (c)(1),
(2) Date: Jul. 13, 2018

(87) PCT Pub. No.: WO2017/134276
PCT Pub. Date: Aug. 10, 2017

(65) Prior Publication Data
US 2019/0077565 A1    Mar. 14, 2019

(30) Foreign Application Priority Data

| Feb. 4, 2016 | (EP) | 16154333 |
| Feb. 4, 2016 | (EP) | 16154336 |
| Sep. 23, 2016 | (EP) | 16190446 |

(51) Int. Cl.
*B65D 75/58* (2006.01)
*F01N 3/20* (2006.01)
(Continued)

(52) U.S. Cl.
CPC ..... *B65D 75/5883* (2013.01); *B01D 53/9418* (2013.01); *F01N 3/035* (2013.01);
(Continued)

(58) Field of Classification Search
CPC ... B65D 75/5883; F01N 13/009; F01N 3/035; F01N 3/0842; F01N 3/2066; F01N 3/2896; B01D 53/9418
See application file for complete search history.

(56) References Cited

U.S. PATENT DOCUMENTS

| 2004/0112915 A1 | 6/2004 | Franczyk |
| 2012/0024814 A1 | 2/2012 | Miyazaki et al. |

(Continued)

FOREIGN PATENT DOCUMENTS

| CN | 102325703 A | 1/2012 |
| CN | 105298595 A | 2/2016 |

(Continued)

OTHER PUBLICATIONS

PCT International Search Report and Written Opinion dated Mar. 27, 2017 for PCT International Patent Application No. PCT/EP2017/052465, 12 pages.
(Continued)

*Primary Examiner* — P. Macade Nichols
(74) *Attorney, Agent, or Firm* — Amster, Rothstein & Ebenstein LLP

(57) ABSTRACT

The application relates to a pouch assembly (100) for containing a liquid being an aqueous urea solution for use in a selective catalytic reduction system for treating the exhaust
(Continued)

gases of an internal combustion engine of a vehicle and for transferring the liquid to a liquid tank of the vehicle from the outside of the liquid tank, the pouch assembly (100) comprising a flexible pouch (1) and a spout (2) attached thereto having a base (21) extending axially through an opening (111) provided in a wall of the pouch (1) and being attached to the opening (111), a top end (22) being configured for insertion in the inside passage of the filling neck (3) of the liquid tank of the vehicle during the filling of the liquid tank, and a body (23) that extends between the base and the top end (22) of the spout (2), the body (23) having an elongated shape, and the body (23) at least partially extending in the inside passage of the filling neck (3) of the liquid tank during the filling of the liquid tank, the base (21), the top end (22) and the body (23) having an elongated axial through-passage (211) to serve as a discharge passage for the liquid. The application relates furthermore to a system comprising such a pouch assembly (100) and a liquid tank having a filling neck (3) allowing insertion of the spout (2) for filling the liquid tank.

16 Claims, 3 Drawing Sheets

(51) Int. Cl.
F01N 13/00 (2010.01)
F01N 3/035 (2006.01)
F01N 3/08 (2006.01)
B01D 53/94 (2006.01)
F01N 3/28 (2006.01)

(52) U.S. Cl.
CPC ......... *F01N 3/0842* (2013.01); *F01N 3/2066* (2013.01); *F01N 3/2896* (2013.01); *F01N 13/009* (2014.06); *B65D 2575/583* (2013.01); *F01N 2610/02* (2013.01); *F01N 2610/142* (2013.01); *F01N 2610/1406* (2013.01); *F01N 2610/1413* (2013.01); *Y02A 50/2325* (2018.01); *Y02T 10/24* (2013.01)

(56) References Cited

U.S. PATENT DOCUMENTS

| | | | |
|---|---|---|---|
| 2015/0048112 A1* | 2/2015 | Skillin | B65D 75/5816 222/107 |
| 2016/0003122 A1 | 1/2016 | Ham et al. | |
| 2016/0257082 A1* | 9/2016 | Ragan | B65D 75/008 |
| 2016/0339370 A1* | 11/2016 | Hudgens | B01D 35/027 |

FOREIGN PATENT DOCUMENTS

| | | |
|---|---|---|
| DE | 10 2014 225119 A1 | 1/2016 |
| EP | 2 399 841 A1 | 12/2011 |
| JP | H11 105895 A | 4/1999 |
| JP | H11 263355 A | 9/1999 |
| WO | 01/23264 A1 | 4/2001 |
| WO | 2017134277 A1 | 8/2017 |

OTHER PUBLICATIONS

PCT International Preliminary Report on Patentability dated dated Nov. 28, 2017 in connection with PCT International Patent Application No. PCT/EP2017/052465, 16 pages.

\* cited by examiner

POUCH ASSEMBLY FOR HOLDING AN AQUEOUS UREA SOLUTION FOR USE IN AN SCR SYSTEM FOR TREATING THE EXHAUST GASES OF AN INTERNAL COMBUSTION ENGINE OF A VEHICLE AND SYSTEM FOR TREATING THE EXHAUST GASES OF AN INTERNAL COMBUSTION ENGINE OF A VEHICLE USING THE AQUEOUS UREA SOLUTION

CROSS-REFERENCE TO RELATED APPLICATIONS

This application is a U.S. national stage entry under 35 U.S.C. § 371 of PCT International Patent Application No. PCT/EP2017/052465, filed Feb. 3, 2017, which claims priority to European Patent Application No. 16154333.5, filed Feb. 4, 2016, European Patent Application No. 16154336.8, filed Feb. 4, 2016, and European Patent Application No. 16190446.1, filed Sep. 23, 2016, the contents of which are incorporated herein by reference in their entirety.

TECHNICAL FIELD

This disclosure relates generally to the technical field of reducing nitrogen oxides ($NO_x$) emissions in the exhaust gases of combustion engines from vehicles by means of a selective catalytic reduction (SCR) system using an aqueous urea solution.

A known application lies in the field of passenger vehicles with internal combustion engines equipped with SCR technology for reducing $NO_x$ emissions. These vehicles have an liquid tank separate from the fuel tank.

The disclosure more specifically relates to disposable, portable containers for storing the aqueous urea solution. An example of such a container is a flexible pouch with a spout for dispensing the aqueous urea solution out of the flexible pouch into the liquid tank of a vehicle.

BACKGROUND

The standards aimed at reducing pollutant emissions generated by motor vehicles are becoming more and more severe. The motor vehicle manufacturers are constantly forced to evolve their technologies in order to comply with these standards. Such standards are amongst others aimed at reducing the discharge of $NO_x$ into the atmosphere.

In order to limit the $NO_x$ emissions, the motor vehicle manufacturers, and currently the diesel engine manufacturers, are more and more making use of the SCR treatment system which allows nitrogen oxides to be reduced through a reducing agent, such as ammonia, in the exhaust line of the vehicle internal combustion engine. This ammonia in general is coming from the thermal decomposition of an aqueous solution of urea which is directly injected into the exhaust line of the vehicle internal combustion engine.

A known SCR treatment system comprises a reservoir containing an aqueous urea solution (hereafter called "liquid tank") that is fixed to the vehicle separate from the fuel reservoir. Furthermore, the SCR treatment system comprises a $NO_x$ catalyst situated in the exhaust line, and an injection device for the aqueous urea solution which is connected to the reservoir and which is designed to inject the aqueous urea solution into the exhaust line of the engine upstream of the $NO_x$ catalyst. The aqueous urea solution that is injected into the exhaust line is converted into ammonia because of the high temperature in this exhaust line. The ammonia thus obtained then reacts, in the NOx catalyst, with the nitrogen oxides resulting from combustion in the vehicle engine so that these oxides are converted by the catalytic reduction into nitrogen ($N_2$) (which no longer presents a danger to the environment), and water ($H_2O$).

AUS32 (according to ISO 22241) is a well-known aqueous urea solution, produced from demineralized water and high-purity urea. In most parts of the world, AUS32 is known as AdBlue®. In North America however, it is known as DEF while in Brazil, it is known as ARLA32. The urea content lies between 31.8% and 33.2% by weight (i.e. 32.5 weight %±0.7 weight %), hence implying an available amount of ammonia between 18.0% and 18.8%. AUS32 is a non-toxic solution that transforms harmful $NO_x$ emissions from internal combustion engines of vehicles into harmless water vapor and nitrogen. The AUS32 is filled into a dedicated AUS32 tank, which is a tank that is separate from the fuel tank.

Already a number of disposable, portable containers with numerous sizes and capacities are known for storing such aqueous urea solutions and distribution to the end user, being the vehicle driver. An example of such a container is a flexible pouch that is provided with a spout for dispensing the aqueous urea solution as contained in the flexible pouch out of the pouch into the liquid tank of the vehicle from the outside of the liquid tank via a filling neck of the liquid tank.

An example of such a flexible pouch that was produced by BASF some years ago is a stand-up pouch with a content of 5 liter of AdBlue®. The stand-up pouch consists of a flexible pouch having a standard, widely available short weld-spout located at the center, top end of the 5 liter pouch. This short weld-spout consisted of a base that is integrated into an orifice in the outer edge of the flexible pouch and that is attached to the orifice via welding, and a top end that is directly connected to the base and that is provided with screw thread for screwing on and off a closure cap.

The disadvantage of the flexible pouch as described above is that it is a standard, off-the-shelf pouch having a standard, short spout. If such standard, short spout were to be used to fill the liquid tank of a vehicle having an onboard tank filling neck with a standard diameter of 19 mm, there is a large risk of spillage of the aqueous urea solution when filling the liquid tank of the vehicle. The short spout, combined with the heavy weight of a filled pouch, could easily result in the accidental pouring of aqueous urea solution outside the onboard tank filling neck. Aside from the unpleasant smell and mess such a spill would generate, there is the very likely risk of corrosion damages to the vehicle, since AUS32 has corrosive properties. Hence, it can be argued that the BASF 5 liter flexible pouch is not in compliance with the ISO 22241-5 norm, that can be summarized as follows:

"The refilling system specified in this part of ISO 22241 has been developed in accordance with passenger vehicle manufacturer's specifications. The functional requirements include a filling system that has minimal obtrusive odors, has minimal spill risk, limits pressure build-up and includes mismatch prevention. The system should be designed to prevent the deleterious effects of AUS 32, including, but not limited to, uncontrolled flow into gaps in body work with the potential to cause corrosion, smell nuisance and crystal formation."

Furthermore, because of this short spout, the risk is high that the spout accidentally slides out of the tank filling neck during the filling of the liquid tank.

An objective is therefore to provide a flexible pouch with a spout that has a reduced spillage risk in the filling of the aqueous urea solution (liquid) into the liquid tank of vehicles and has a reduced risk of accidentally sliding out of the tank filling neck during the filling of the liquid tank.

It is a further objective to provide a flexible pouch with a spout that optimizes the ease-of-use to the user, that allows an ergonomic handling of the pouch with the spout by the user and that provides an efficient travelling through the supply chain, including the point-of-sale.

SUMMARY OF THE INVENTION

According to one aspect of the application, a pouch assembly is described comprising a flexible pouch containing a liquid being an aqueous urea solution for use in a selective catalytic reduction system for treating the exhaust gases of an internal combustion engine of a vehicle. The pouch assembly is adapted for transferring the liquid in the flexible pouch to a liquid tank of the vehicle from the outside of the liquid tank. The pouch assembly comprises a flexible pouch and a spout attached thereto. At least a part of the spout extends outside the flexible pouch which spout is arranged to dispense liquid contained in the flexible pouch into the liquid tank of the vehicle via a tank filling neck. The tank filling neck is configured to receive the spout. More in particular, the tank filling neck has an inside passage into which the spout can at least partially extend or be inserted during the filling of the liquid tank. The spout comprises a base having an elongated axial through-passage to serve as a discharge passage for the liquid, the base extending axially through an opening provided in a wall of the pouch and being attached in fixed relation to the opening. The base is in sealing connection with the opening, such that liquid contained in the pouch passes through the flexible pouch opening and through the base elongated axial through-passage. The spout further comprises a top end having an elongated axial through-passage in fluid connection with the base elongated axial through-passage; it also serves as a discharge passage for the aqueous urea solution. The top end of the spout is insertable into the inside passage of the filling neck of the liquid tank of the vehicle for the filling thereof. The spout further comprises a body that extends between the base end and the top end of the spout, that has an elongated shape, that has an elongated through-passage in fluid connection with base and top end elongated axial through-passages; it serves also as a discharge passage for the aqueous urea solution. The spout body is configured to at least partially extend into the inside passage of the tank filling neck for the filling of the liquid tank. The body of the spout is furthermore disposed with a ring-shaped (annular) protrusion extending at least partially around a circumference of the outer body of the spout. The tank filling neck is disposed with at least one protrusion configured to cooperate with the spout ring-shaped protrusion for releasable latching of the spout in the tank filling neck.

When the spout and the tank filling neck are latched together, the protrusion on the body of the spout impedes the accidental sliding of the spout out of the tank filling neck during the filling of the liquid tank. The latching of the spout and the tank filling may be accompanied by a "click" sound indicative of the protrusion sliding past the protrusion disposed in the tank filling neck.

The body of the spout thus has an elongated shape. The term "elongated" means "having a length that is greater than the width". Reference to an axial length or direction refers to the longer length of the elongated shape. This elongated shape of the spout ensures that during filling, not only the top end of the spout is located into the tank filling neck but also part of the body or the whole body.

Furthermore, since the spout body has an elongated shape, during the insertion of the spout into the tank filling neck, the spout is guided into the tank filling neck. This allows an easy insertion of the spout into the tank filling neck.

Also, since the top end of the spout during filling is located inside the filling neck of the liquid tank of the vehicle, aqueous urea solution is prevented from running out of the filling neck of the liquid tank during the filling process, also reducing or even removing the spillage risk.

In a possible embodiment, the spout is made in one piece. In other words, the base, the body and the top end are non-releasably connected to each other. This has the advantage that only a single spout has to be designed and produced. Furthermore, no additional manufacturing steps need to be performed by the manufacturer, nor any additional operations need to be performed by the end user. Making the spout out of one piece also has the advantage in the storing of the flexible pouches since there is the possibility that certain parts of the spout disconnect for instance upon transport or storage is minimized.

In a particular embodiment, the body of the spout has a ring-shaped (annular) protrusion that extends at least partially around the circumference of the body of the spout, and the tank filling neck has one protrusion protruding to the inside passage of the tank filling neck; the filling neck protrusion may axially extend in a portion of the inside passage over the whole circumference of the inside passage of the tank filling neck (or in other words an annular protrusion extending axially over the circumference of the inside passage of the filling neck), or a plurality of protrusions in the form of elongated ribs that extend axially in a portion in the inside passage of the tank filling neck and that protrude in the inside passage of the tank filling neck, the one or more protrusions each having a latching edge, wherein the protrusion of the body of the spout is arranged to releasably click over the latching edge of the one or more protrusions.

In a possible embodiment of a pouch assembly, the ring-shaped protrusion extends completely around the circumference of the body of the spout.

In an embodiment of a pouch assembly, the body of the spout has a lower end that is connected to the base of the spout and an upper end that is connected to the top of the spout, wherein the body has one or more regions of gradual diameter reduction from the lower end to the upper end thereof. In other words, the body may contain one or more regions that are tapered, the wider end of the taper being towards the lower end of the body.

The gradually decreasing diameter assists easy insertion into the tank filling neck and furthermore that the spout has a shape such that it fits adequately into the tank filling neck.

In a possible embodiment of a pouch assembly, the ring-shaped protrusion divides the body of the spout in a first body part and a second body part, the first body part extending between the lower end of the body and the ring-shaped protrusion and a second body part extending between the ring-shaped protrusion and the upper end of the body of the spout. The first and second body parts may each contain a region of gradual diameter reduction from the lower end to the upper end, a graduality of diameter reduction in the second body part being greater than that in the first body part.

In other words, the decrease in diameter of the second body part from the ring-shaped protrusion towards the upper end of the body of the spout may be larger than the decrease in diameter of the first body part from the lower end of the body of the spout towards the ring-shaped protrusion.

This form of the spout is suitable for an easy insertion of the spout into the tank filling neck and for fitting in an appropriate way into the tank filling neck during the filling of the liquid tank of the vehicle.

A further disadvantage of the pouch as commercialized by BASF (as described above) is its overall design with the short spout centered at the top of the pouch, which in itself, combined with the heavier weight of the 5 liter content, would make it less easy to handle and therefore make accidental spillage more likely.

Furthermore, this design makes the packaging properties of the pouch less efficient throughout the supply chain as it takes up more space, both in transport cartons and on-shelf at point of sale, thereby causing costly inefficiencies both from a cost and environmental perspective.

This problem is solved by an embodiment of a pouch assembly comprising a flexible pouch and a spout wherein the wall of the flexible pouch comprises a first part that includes the opening into which the base of the spout is integrated, this part being planar and obliquely arranged with respect to a horizontal plane when the pouch assembly is considered in an upright (stand-up) position. The horizontal plane may be parallel to a base of the flexible pouch which base is essentially flat providing a standing support.

This planar and oblique first part of the wall of the flexible pouch assists in ease of tilting of the flexible pouch towards the liquid tank of the vehicle in order to transfer liquid therefrom and is in an ideal position during the transfer of liquid to the liquid tank.

In a possible embodiment of a pouch assembly, the flexible pouch is configured such that the spout is attached to a first part of the flexible pouch wall the first part disposed between adjacent second and third parts of the flexible pouch wall, wherein each of the first, second and third parts are oriented such that fictive planes contacting and extending from each of the first, second and third parts intersect to form a geometric space. The geometric space may have a triangular profile (cross section).

The geometric space may have triangular prism shape. The top end of the spout, more specifically the top end of the spout together with the cap, even more specifically, the body of the spout together with the cap are contained within the geometric space. According to one aspect, the flexible pouch has an essentially cuboid shape, wherein the spout is disposed on a chamfered edge between two faces, and the geometric space is formed by the intersection of fictive planes contacting and extending from each of the chamfered edges and the faces.

This has the advantage that the pouch assembly can efficiently be packaged into transport cartons or pallet configuration as well as having an efficient on-the-shelf space in a point-of sale.

In an embodiment of a pouch assembly, the outer body of the spout and/or the top end of the spout have an essentially cylindrical outer shape. The diameter of the cylinder may or may not be uniform as a function of its length.

Since the shape of the tank filling neck is also cylindrical, it is most convenient that also the body of the spout and most likely also the top end of the spout have a cylindrical outer shape.

In an embodiment of a pouch assembly, the body of the spout extends completely into the inside passage of the filling neck of the liquid tank of the vehicle when the spout is inserted into the filling neck for filling the vehicle tank at least partially with the aqueous urea solution contained in the pouch.

This increases the advantage that the spout cannot easily fall out of the filling neck of the liquid tank during the filling thereof.

In a possible embodiment of a pouch assembly, the spout and the cap are each provided with a co-operating screw thread for repeatable releasable attachment of the screw the cap to the spout.

This has the advantage that, when the flexible pouch has been partially emptied, the fluid can be stored in the pouch assembly until a subsequent transfer of fluid to the liquid tank is necessary.

In a possible embodiment, the cap is provided with a tamper-evidence ring that maintains connection with the cap when the cap is unscrewed from the spout. This removes the risk that the tamper-evidence ring could accidentally fall off the spout and into the liquid tank during the filling thereof.

In an embodiment of a pouch assembly, the spout body has a length that is between 5 and 10 times the length of the base of the spout.

In an embodiment of a pouch assembly, the body has a length that is between 2 and 6 times the length of the top end of the spout.

In an embodiment of a pouch assembly, the first body part has a length that is between 0.5 and 2 times the length of the second body part of the spout. According to a further aspect of the application, a system for treating the exhaust gases of an internal combustion of a vehicle using a aqueous urea solution, the system comprises:

a liquid tank located in the vehicle, the liquid tank having
   a tank filling neck for filling the liquid tank with the aqueous urea solution from the outside of the liquid tank, and a pouch assembly (100) as described herein.

According to a further aspect of the application, a system for treating the exhaust gases of an internal combustion of a vehicle using a liquid being an aqueous urea solution is disclosed, the system comprising a liquid tank located in the vehicle, the liquid tank having a tank filling neck for filling the tank with liquid from the outside of the liquid tank, and a pouch assembly containing the liquid for use in a selective catalytic reduction system for treating the exhaust gases of an internal combustion engine of a vehicle and for transferring the liquid to a liquid tank of the vehicle from the outside of the liquid tank with liquid contained in the pouch, the pouch assembly comprising a flexible pouch and a spout attached thereto wherein which at least a part of the pouch extends outside the flexible pouch and that is arranged to dispense liquid in the flexible pouch out of the flexible pouch into the liquid tank of the vehicle via the tank filling neck that has an inside passage into with the spout partially extends during the filling of the liquid tank, wherein the spout comprises a base having an elongated axial through-passage to serve as a discharge passage for the liquid, the base extending axially through an opening provided in an outer wall of the pouch and being attached to the opening, and a top end having an elongated axial through-passage to serve as a discharge passage for the liquid, the top end being configured for insertion into the tank filling neck during the filling of the liquid tank, wherein the spout further comprises a body that extends between the base and the top end of the spout, that has an elongated shape, that has an elongated through-passage to serve as a discharge passage for the liquid, and is configured to at least partially extend into the tank filling neck for the transfer of liquid into the liquid tank.

In a possible embodiment of a system, the system comprises a flexible pouch according to the application as described above.

DETAILED DESCRIPTION OF THE INVENTION

Figure 1:
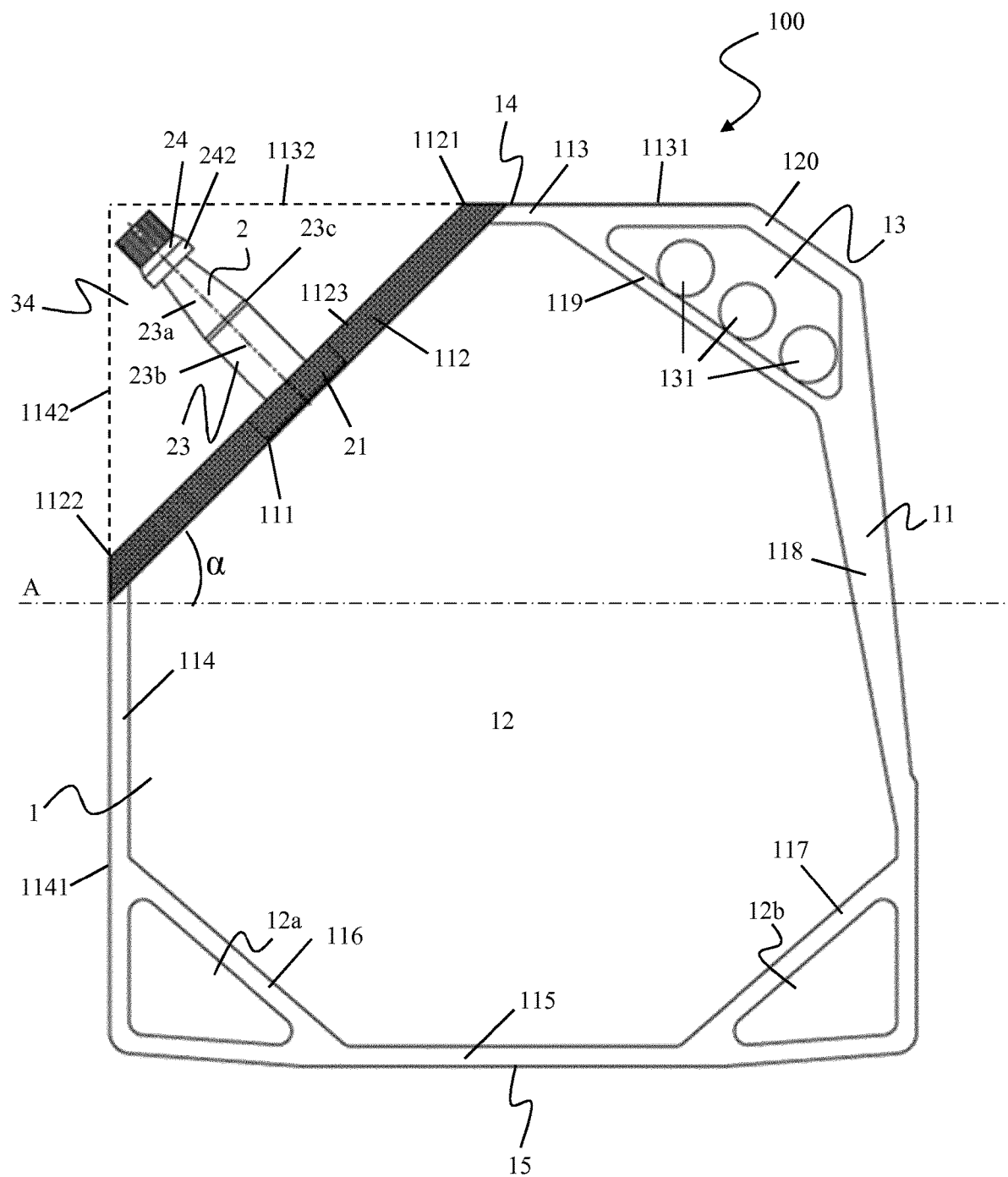
FIG. 1 shows a front view of a pouch assembly comprising a flexible pouch with a spout according to the application in an upright position.

Before the present assembly and system of the application are described, it is to be understood that this application is not limited to particular assemblies and systems or combinations described, since such assemblies and systems and combinations may, of course, vary. It is also to be understood that the terminology used herein is not intended to be limiting, since the scope of the present application will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, specifically +/−5% or less, more specifically +/−1% or less, and still more specifically +/−0.1% or less of and from the specified value, insofar such variations are appropriate to perform in the disclosed application. It is to be understood that the value to which the modifier "about" or "approximately" refers is itself also specifically disclosed.

Whereas the terms "one or more" or "at least one", such as one or more or at least one member(s) of a group of members, is clear per se, by means of further exemplification, the term encompasses inter alia a reference to any one of the members, or to any two or more of the members, such as, e.g., any $\geq 3$, $\geq 4$, $\geq 5$, $\geq 6$ or $\geq 7$ etc. of the members, and up to all the members.

All references cited in the present specification are hereby incorporated by reference in their entirety. In particular, the teachings of all references herein specifically referred to are incorporated by reference.

Unless otherwise defined, all terms used in disclosing the application, including technical and scientific terms, have the meaning as commonly understood by one of ordinary skill in the art to which this application belongs. By means of further guidance, term definitions are included to better appreciate the teaching of the present application.

In the following passages, different aspects of the application are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present application. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the application, and form different embodiments, as would be understood by those in the art. For example, in the appended claims, any of the claimed embodiments can be used in any combination.

In the present description of the application, reference is made to the accompanying drawings that form a part hereof, and in which are shown by way of illustration only of specific embodiments in which the application may be practiced. Parenthesized or emboldened reference numerals affixed to respective elements merely exemplify the elements by way of example, with which it is not intended to limit the respective elements. It is to be understood that other embodiments may be utilized and structural or logical changes may be made without departing from the scope of the present application. The following detailed description, therefore, is not to be taken in a limiting sense, and the scope of the present application is defined by the appended claims.

The flexible pouch assembly comprises a spout operably connected to flexible pouch holding a aqueous urea solution and more in particular AUS32 that is a (32.5±0.7) weight % urea solution in demineralized water, complying with the ISO 22241 standard.

This aqueous urea solution is used in a selective catalytic reduction system (SCR) system for treating the exhaust gases of an internal combustion engine of a vehicle. At present, only the exhaust gases of internal diesel engines are treated. This does not take away the fact that also the exhaust gases of internal gasoline engines could be treated to reduce the $NO_x$ emissions therein.

As can be seen in FIG. 1 for instance, the pouch assembly (100) comprises a flexible pouch (1) that comprises a wall (11) extending around the flexible pouch (1). This wall (11) surrounds a cavity (12) that is able to contain the liquid that is an aqueous urea solution. The wall (11) may be divided into one or more faces. The faces may be essentially planar. The flexible pouch (1) may have an essentially cuboid shape. One or more of the cuboid edges or vertices may be chamfered. The chamfered edge may be essentially planar. FIG. 1 illustrates two adjoining faces (113) and (114) of the wall (11) having a planar chamfered edge (112). The flexible pouch (1) has a base end (15) and a upper end (14), the base end (15) providing a support for maintaining an upright position of the pouch assembly (100).

The pouch assembly (100) is further provided with a spout (2). The spout (2) is configured for pouring out the liquid content of the flexible pouch (1) and is attached to the flexible pouch (1). The spout (2) is disposed toward the upper end (14) of the flexible pouch (1). The spout (2) may be attached to a chamfered edge of the pouch wall (1) which chamfered edge is between a top face and a side face of the pouch wall (11).

The spout (2) is provided with a base (21) that is fully integrated into and attached to an opening (111), more specifically a slot-like opening, that is arranged in the wall (11) of the flexible pouch 1. The base (21) has an elongated axial through-passage (211) that serves as a discharge opening for the aqueous urea solution that is contained in the cavity (12) of the flexible pouch (1). The base (21) elongated axial through-passage (211) is in fluid connection with the flexible pouch cavity (12). The base (21) may have an outer profile that is larger than that of the body (23) or of the top end (22). The base (21) may be provided with an outer profile having a horizontal cross section (B) (see FIG. 3) with an almond shape.

The spout (2) further comprises a front or top end (22) that is situated at the opposite end of the base (21). The top end (22) has an elongated axial through-passage (221) that serves as a discharge opening for the aqueous urea solution towards the outside or exit of the spout (2). The top end (22) elongated axial through-passage (221) is in fluid connection with the base (21) elongated axial through-passage (211). The top end (22) elongated axial through-passage (221) is in fluid connection with the flexible pouch cavity (12). The top end (22) may be disposed with an exterior or interior thread for attachment to a cap (24). The top end (22) may have transverse (perpendicular to a longitudinal central axis (X) of the spout (2)) cross-sectional profile that is smaller than the minimum cross-sectional profile of the body (23). The top end (22) may have an outer diameter smaller than the minimum diameter of the body (23). The top end (22) may have an essentially circular outer profile.

A body (23) extends between the base (21) and the top end (22). This body (23) has an elongated shape and has an elongated axial through-passage (231) to serve as a discharge passage for the aqueous urea solution. The elongated axial through-passage (231) is in fluid connection with base (21) and top end (22) elongated axial through-passages (211, 221). The body (22) elongated axial through-passage (231) is in fluid connection with the flexible pouch cavity (12).

The body (23) may have a length $L_1$ that is between 4 and 12 times the length $L_2$ of the base (21). More specifically, the body (23) may have a length $L_1$ that is between 5 and 10 times, and most specifically around 6 times the length $L_2$ of the base 21. The respective lengths are measured parallel to a longitudinal central axis (X) of the spout (2).

The body (23) may have a length $L_1$ that is between 2 and 6 times the length $L_3$ of the top end (22). More specifically, the body (23) may have a length $L_1$ that is between 2 and 5 times, and most specifically around 3 times the length $L_3$ of the top end (22). The respective lengths are measured parallel to a longitudinal central axis (X) of the spout (2).

Since the base (21) is integrated into the wall (11) of the flexible pouch (1), and the body (23) and the top end (22) are disposed on the outside of the pouch (1), it can be stated that at least a part of the spout (2) extends outside the flexible pouch (1). By integrated, it is meant that the base (21) at least partly passes through the wall (11) of the flexible pouch (1). The base (21) is attached to the flexible pouch wall (11) to form a liquid impermeable sealing connection.

The spout (2) may be made from one piece, meaning that the base (21), the body (23) and the top end (22) may be inseparably connected to each other, for instance they may be non-releasably connected to each other. The production processes are available to ensure a one piece construction of the spout (2), for instance, injection moulding.

Figure 4:
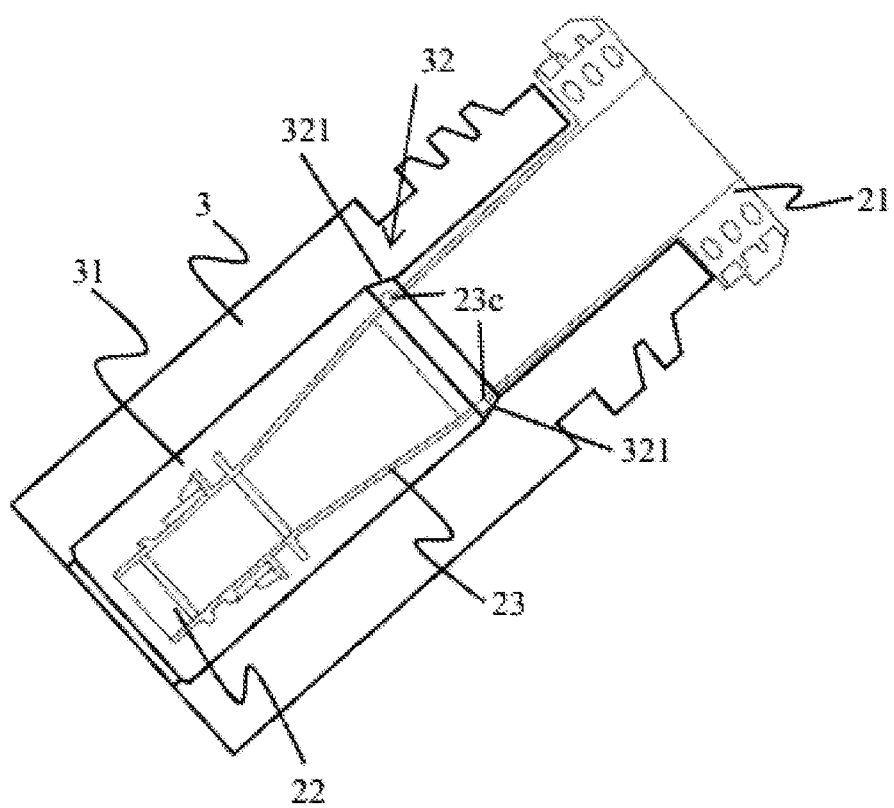
FIG. 4 shows a cross section of the spout as shown in FIGS. 1 and 2 inserted into a tank filling neck of a liquid tank of a vehicle.

The filling tank of the vehicle (not shown on the drawings) is provided with a tank filling neck (3) having an inside passage (31), as shown for instance in FIG. 4. During the filling process of the liquid tank, the top end (22) of the spout (2) as well as at least part of the body (23), and more particular the complete body (23) of the spout (2), extends into the inside passage (31) of the tank filling neck (3). Accordingly, the spout (2) may be configured such that at least part of the body (23), and more particular the complete body (23) of the spout (2), engages with the inside passage (31) of the tank filling neck (3).

During the filling process of the liquid tank of the vehicle, the aqueous urea solution contained in the flexible pouch (1) will flow through the through-passage (211) of the base (21), through the through-passage (223) of the body (23), through the through-passage (221) of the top end (22) into the tank filling neck (3), and finally into the liquid tank.

Figure 2:
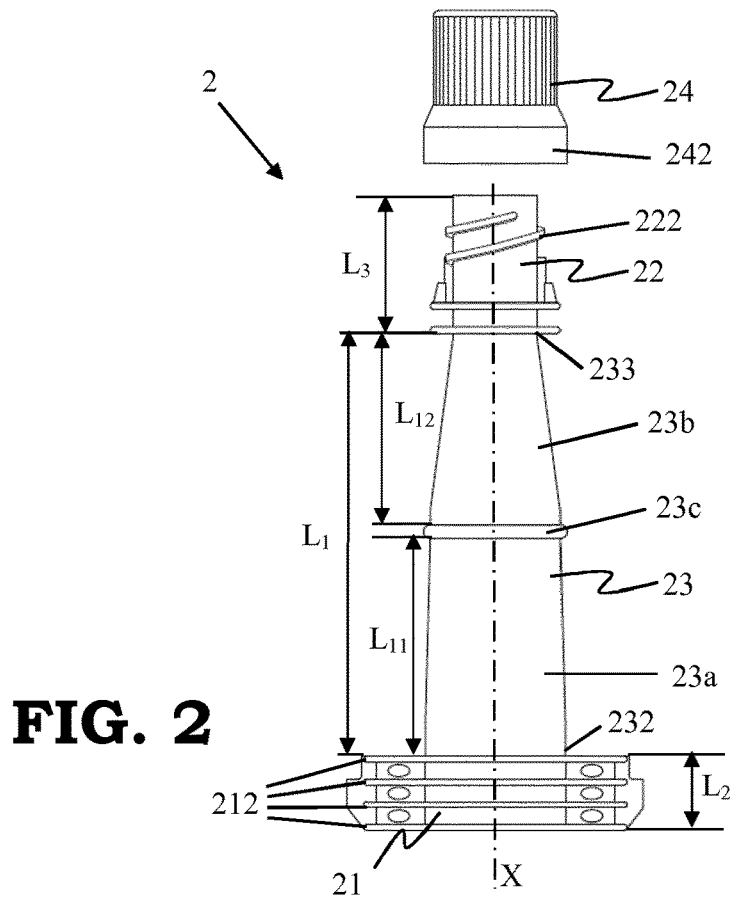
FIG. 2 shows a front view of the spout as shown in FIG. 1.
Figure 3:
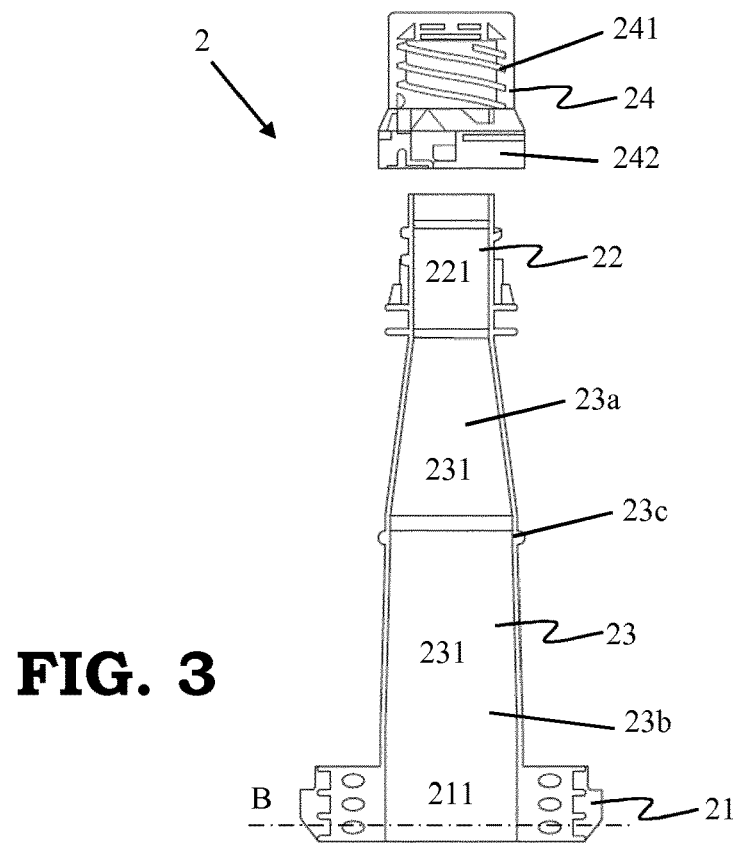
FIG. 3 shows a longitudinal cross section of the spout as shown in FIG. 2.

In an embodiment, the top end (22) of the spout (2) is releasably closable by a cap (24) as shown, for instance in FIGS. 2 and 3. The top end (22) of the spout (2) may be repeatably releasably closable by the cap (24). The spout top end (22) may be configured for coupling to a cap (24) for the releasable closure of the spout (2) by the cap (24). More specifically, the top end (22) of the spout (2) and the cap (24) may be provided with a corresponding or co-operating screw thread (222) and (241) to screw the cap (24) on and off the top end (22) of the spout (2)—in other words for releasable closure of the spout (2). The body (23) is particularly unthreaded.

The cap (24) may be provided with a tamper-evidence ring (242) which stays connected to the cap (24) (and not to the spout (2)) when the cap (24) is unscrewed from the spout (2). The tamper-evidence ring (242) may be at least partly rigidly connected to the cap (24). The tamper-evidence ring (242) may be non-releasably connected to the cap (24).

In an embodiment, the base (21) of the spout (2) is welded directly in the opening (111) provided in the wall (11) of the flexible pouch (1) via, for example, a thermal weld. In this way, the base (21) is permanently attached to the opening (111).

Furthermore, the flexible pouch (1) together with the spout (2) are formed essentially of one piece, benefiting the handling of the flexible pouch (1) with spout (2) i.e. the pouch assembly (100).

A permanent connection between the base (21) and the opening (111) may also be produced by other methods of heat transport such as hot sealing or adhesive bonding. In order to have a solid welding connection, the base (21) is in a material that is compatible with the material of the flexible pouch (1).

In the particular embodiment at the base (21) has a number of welding ribs or fins (212) that are axially spaced from each other and that are formed as one piece with the remainder of the base (21), as shown for instance, in FIG. 2. Such fins (212) are disposed on the outside of the base. These welding fins (212) protrude outwardly from the outer surface of the base (21) and extend around the outer surface of the base (21). The fins (212) may have an essentially annular form.

In an embodiment of a pouch assembly (100), the body (23) of the spout (2) is disposed with a ring-shaped (annular) protrusion (23c) extending at least partially around a circumference of the outer body of the spout (2), and wherein the tank filling neck (3) may have on the inside passage (31) disposed with at least one protrusion (32) configured to co-operate with the spout ring-shaped protrusion (23c) for releasable latching of the spout in the tank filling neck (3). The latching connection fixes the body (23) of the spout (2) and the tank filling neck (3) in slidable relation which can be overcome by the application of addition sliding force. The latching together and/or apart of the parts may be accompanied by a "click" sound indicative of the ring-shaped protrusion (23c) sliding past the protrusion (32) disposed in the inside passage (31) of the tank filling neck (3).

The body (23) of the spout (2) may be provided with a ring-shaped protrusion (23c) that extends at least partially around the circumference of the body (23), and optionally completely around the circumference of the body (23), as shown for instance, in FIGS. 2 and 3. The tank filling neck (3) may have on the inside passage (31) thereof:

- either one protrusion (32) that protrudes to the inside passage (31) of the tank filling neck (3) and that extends for an axial portion of the inside passage (31) over a complete circumference of the inside (31) of the tank filling neck (3)—in other words a continuous protrusion, or
- a plurality of protrusions (32) in the form of elongated ribs that extend axially in the inside passage (31) of the tank filling neck 3 for an axial portion of the inside passage (31) and that protrude in the inside passage (31) of the tank filling neck (3).

An exemplary filling tank neck (3) is shown in FIG. 4.

Each of these protrusions (32) may have a latching edge (321) (FIG. 4). The latching edge (321) is an edge of the protrusion (32) most distance from an entry to the tank filling neck (3); it engages with the ring-shaped protrusion (23c) to limit movement of the spout (2) relative to the neck (3). The latching edge (321) may be bevelled relative to the wall of the neck inner passage (31). When the spout (2) is inserted in the inside passage (31) of the tank filling neck (3), the ring-shaped protrusion (23c) clicks over the latching edge (321) of the one or more protrusions (31), thereby latching the spout (2) within the inside passage (31) of the tank filling neck (3). When retracting the spout (2) from of the inside passage (31) of tank filling neck (3), the ring-shaped protrusion (23c) clicks again over the latching edge (321) of one or more protrusions (32) through which the spout (2) can be released out of the tank filling neck (3) again. In other words, the ring-shaped protrusion (23c) of the body (23) is arranged to releasable click over the latching edge (321) of the one or more protrusions (32) that are provided in and are protruding in the inside (31) of the tank filling neck (3). In an embodiment, the ring-shaped protrusion (23c) is such that clicking of the ring-shaped protrusion (23c) over the under-edge (321) of the ribs (32) allows that the spout (2) can easily be put in and taken out again of the tank filling neck (3).

The body (23) of the spout (2) may have a lower end (232) that is connected to the base (21) of the spout (2) and an upper end (233) that is connected to the top end (22) of the spout (2) as shown, for instance, in FIGS. 2 and 3. The body (23) may have a diameter that decreases gradually from the lower end (232) to the upper end (233) thereof. The body (23) may have one or more regions of gradual diameter reduction from the lower end (232) to the upper end (233) thereof. In other words, the body (23) may contain one or more regions that are tapered, the wider end of the taper being towards the lower end (232) of the body (23).

The ring-shaped protrusion (23c) may divide the body (23) of the spout (2) into a first body part (23a) extending between the lower end (232) of the body (23) and the ring-shaped protrusion (23c), and a second body part (23b) extending between the ring-shaped protrusion (23c) and the upper end (233) of the body (23) of the spout (2) as shown for instance in FIGS. 2 and 3. The decrease in diameter of the second body part (23b) from the ring-shaped protrusion (23c) towards the front side (233) of the body (23) is bigger than the decrease in diameter of the first body part (23a) from the lower end (232) of the body (23) towards the ring-shaped protrusion (23c). The first (23a) and second (23b) body parts may each contain a region of gradual diameter reduction from the lower end (232) to the upper end (233). A graduality of diameter reduction in the second body part (23b) may be greater than that in first body part (23a). The graduality refers to a gradient i.e. to a rate of change of diameter as a function of body length. The maximum diameter in the first body part (23a) in the region of gradual diameter reduction may be greater than the maximum diameter in the second body part (23b) in the region of gradual diameter reduction. The maximum diameter in the first body part (23a) in the region of gradual diameter reduction may be equal to or greater than the minimum diameter in the second body part (23b) in the region of gradual diameter reduction.

The first body part (23a) has a length $L_{11}$ that may be between 0.5 and 2 times the length ($L_{12}$) of the second body part (23b) of the spout (2). More specifically, the first body part (23a) has a length $L_{11}$ that may be between 0.8 to 1.5 times, and most specifically around 1.2 times the length $L_{12}$ of the second body part (23b). The respective lengths are measured parallel to a longitudinal central axis (X) of the spout (2).

In an embodiment of a pouch assembly (100), the body of the spout (2) and/or the top end (22) of the spout (2) have a tubular shape, specifically a cylindrical shape. The diameter of the cylinder may or may not be uniform as a function of its length; as mentioned earlier it may contain one or more regions of gradually changing diameter. The spout (2) may have another shape, but with the condition that the top end 22 and at least a part of the base (21) of the spout (2), more particularly the whole body (23) of the spout (2), is insertable into the filling neck (3) of the vehicle tank.

Owing to the presence of the one or more protrusions (32) on the inside passage (31) of the tank filling neck (3), and the shape of the body (23) and the top end (22) of the spout as described above, vapours that are released during the filling of the liquid tank can still escape from the tank filling neck (3).

In a possible embodiment, the wall (11) of the pouch (1) comprises a first part (112) that is provided with the opening (111) into which the base (21) of the spout (2) is integrated, this part being essentially planar and obliquely arranged with respect to a horizontal plane when the flexible pouch (1) is considered in an upright position. An upright position is typically when the spout (2) is oriented upwards. The horizontal plane may be parallel to a base of the flexible pouch (1) which base is essentially flat providing a upright-standing support.

As can be seen in FIG. 1, this first part (112) is more specifically inclined at an angle α of between 30° and 60° in view of the horizontal plane (A) when the flexible pouch (1) is considered in an upright position. More specifically, the first part (112) may be inclined under at angle α of around 45° in view of the horizontal plane A when the flexible pouch (1) is considered in an upright position.

In a possible embodiment, the flexible pouch assembly (100) is configured such that the spout (2) is attached to a first part (112) of the flexible pouch wall (11) the first part (112) disposed between adjacent or adjoining second part (113) and third part (114) of the flexible pouch wall (11) wherein each of the first (112), second (113) and third (114) parts are oriented such that fictive planes contacting and parallel to and extending from each of the first (112), second (113) and third (114) parts outer surface intersect to form a geometric space (34). The geometric space (34) may have a triangular profile (cross section). The geometric space (34) may have triangular prism shape. The top end of the spout, more specifically the top end of the spout together with the cap, even more specifically, the body of the spout together with the cap are contained within the geometric space. The second part (113) may be a top face of the flexible pouch (1) and the third part (114) may be a side face of the flexible pouch (1).

According to one aspect, the flexible pouch (1) wall (11) comprises two side walls joined by an edge wall; the first part (112), second part (113) the third part (114) may disposed on the edge wall.

According to one aspect, the flexible pouch (1) has an essentially cuboid shape, wherein the spout is disposed on a chamfered or oblique edge between two faces, and the geometric space is formed by the intersection of fictive planes contacting, parallel to and extending from the outer surface of each of the chamfered edge and the faces. The chamfered edge may be essentially planar. The two faces correspond to the second (113) and third (114) parts and the chamfered edge corresponds to the first part (112).

In view of efficient packaging as well as on-the-shelf space usage at a point-of-sale of the flexible pouches (1) with spout (2), wherein the cap (24) that is placed on the top end (22) of the spout (2) and the body (23) of the spout (2) are extending within this space (14). In other words, the spout (2) with the screwed on cap (24) does not protrude outside the space which the overall flexible pouch 1 occupies.

In another possible embodiment assembly, first part (112) of the flexible pouch (1) wall (11) has an outer side (1123), and at a first end (1121) thereof is connected to the second part (113) of the pouch wall (11), and at second, opposite end (1122) thereof is connected to a third part (114) of the pouch wall (11). This second part (113) has an outer side (1131) and this third part (114) has an outer side (1141). When the outer side (1123) of the first part (112), the imaginary extension (1132) of the outer side (1131) of the second part (113) and the imaginary extension (1142) of the outer side (1141) of the third part 114 are considered, these form an imaginary triangular space (34).

The flexible pouch (1) may be formed from two or more adjacent film-like sheets of a plastic material that are sealed to each other by means of heat sealing. Each of the sheets may be made from the same or from different materials focussing on different necessary properties such as printing precision properties, protrusion protection properties, sealing properties, etc.

In an embodiment, the sheets are made from a thermal plastic material that are heat sealed to each other at their respective outer edges thereby forming the wall (11) of the flexible pouch (11) that encloses the cavity (12). According to one aspect, a seal runs around edge of the wall, in particular across a face of the first part (112) of the wall (11)

The pouch assembly (100) may be provided with a handle (13). The handle may be disposed within a chamfered edge of the flexible pouch (1). The chamfered edge may be disposed opposite the spout on an upper side of the flexible pouch (1) as shown for instance, in FIG. 1. This handle (13) may be integrated into the surface of the flexible pouch (1) and surrounded by the parts (118), (119), (120) and (113) of the wall (11) of the flexible pouch (1).

The handle (13) may be provided with a number of holes (131), for instance three as shown for instance in FIG. 1, that each are accommodated to receive a finger of the user.

This handle (13) enables an easy and comfortable handling of the pouch assembly (100). It allows that the pouch assembly (100) can easily be carried by the end user thereof and allows that it is easy to put the spout (2) into the filling neck of the liquid tank of the vehicle.

The pouch assembly (100) may be provided with a number of supporting flaps at a base of the flexible pouch (1) as shown for instance in FIG. 1. At the left side of the flexible pouch (1) there may be provided two supporting flaps (12a), one at the front and one at the back of the flexible pouch (1) At the right side of the flexible pouch (1) there may also be provided supporting flaps (12b), also one at the back and one at the front of the flexible pouch (1). These supporting flaps (12a) and (12b) allow the flexible pouch (1) to remain upright when the flexible pouch (1) is filled and in an upright position. The supporting flaps (12a) and (12b) may be integrated into the surface of the flexible pouch (1). The left supporting flaps (12a) are surrounded by the parts (115), (114) and (116) of the wall (11) of the pouch (1). The right supporting flaps (12b) are surrounded by the parts (115), (117) and (118) in FIG. 1.

In an embodiment, a system is provided for treating the exhaust gases of an internal combustion of a vehicle using a liquid being an aqueous urea solution, the system comprising
    a liquid tank located in the vehicle, the liquid tank having a tank filling neck (3) for filling the liquid tank with the liquid from the outside of the liquid tank, and
    a pouch assembly (100) as described herein.

The flexible pouch (1) with spout (2) i.e. the pouch assembly (100) as described above is particularly suitable to be used for filling the liquid tank of a passenger vehicle, however not excluding that it also can be used for filling the liquid tank of other vehicles.

The flexible pouch (1) with spout (2) i.e. the pouch assembly (100) as described above fulfills the specifications as outlined in the ISO 22241-5 norm.

The flexible pouch (1) with spout (2) as described above has a simple design, a limited production cost, a limited weight and a limited plastic content.

The invention claimed is:
1. A pouch assembly (100) containing a liquid being an aqueous urea solution for use in a selective catalytic reduction system for treating exhaust gases of an internal combustion engine of a vehicle and for transferring the liquid to a liquid tank of the vehicle, the pouch assembly (100) comprising a flexible pouch (1) and a spout (2) attached thereto wherein at least a part of the spout (2) extends outside the flexible pouch (1) and that is arranged to dispense the liquid contained in the flexible pouch (1) into the liquid tank of the vehicle via a tank filling neck (3) configured to receive the spout (2), wherein the spout (2) comprises
    a base (21) having an elongated axial through-passage (211) to serve as a discharge passage for the liquid, the base (21) extending axially through an opening (111) provided in a wall (11) of the pouch (1) and being attached to the opening (111),
    a top end (22) having an elongated axial through-passage (221) in fluid connection with the base (21) elongated axial through-passage (211), the top end (22) config- ured for insertion into the filling neck of the liquid tank for transfer liquid into the liquid tank;

wherein the spout (2) further comprises a body (23) that
extends between the base (21) and the top end (22) of the spout (2), has an elongated shape, has an elongated axial through-passage (231) in fluid connection with base (21) and top end (22) elongated axial through-passages (211, 221), and is suitable for at least partially extending into the tank filling neck (3) of the liquid tank for the transfer of liquid into the liquid tank, and wherein the body (23) of the spout (2) is disposed with a ring-shaped protrusion (23c) extending at least partially around a circumference of the body (23) of the spout (2), and the tank filling neck (3) is disposed with at least one protrusion (32) configured to co-operate with the spout ring-shaped protrusion (23c) for releasable latching attachment of the pouch spout (2) in the tank filling neck (3).

2. The pouch assembly (100) according to claim 1, wherein the spout (2) is formed of one piece.

3. The pouch assembly (100) according to claim 1, wherein the at least one tank filling neck (3) protrusion is a single protrusion (32) protruding towards an inside passage (31) of the tank filling neck (3) and extending axially in portion of the inside passage (31) of the filling neck (3) over the whole circumference of the inside passage (31) of the tank filling neck (3), or is a plurality of protrusions (32) in the form of elongated ribs that extend axially in a portion in the inside passage (31) of the tank filling neck (3) and that protrude in the inside passage (31) of the tank filling neck (3), each of the protrusions (32) having a latching edge (321), wherein the protrusion (23c) of the body (23) of the spout (2) is arranged to releasably latch against the latching edge (321) of the one or more protrusions (32).

4. The pouch assembly (100) according to claim 3, wherein the ring-shaped protrusion (23c) extends completely around the circumference of the body (23) of the spout (2).

5. The pouch assembly (100) according to claim 1, wherein the body (23) of the spout (2) has a lower end (232) that is connected to the base (21) of the spout (2) and a upper end (233) that is connected to the top end (23) of the spout (2), wherein the body (23) has one or more regions of gradual diameter reduction from the lower end (232) to the upper end (233) thereof.

6. The pouch assembly (100) according to claim 1, wherein the ring-shaped protrusion (23c) divides the body (23) of the spout (2) in a first body part (23a) and a second body part (23b), the first body part (23a) extending between the lower end (232) of the body (23) and the ring-shaped protrusion (23c) and the second body part (23b) extending between the ring-shaped protrusion (23c) and the upper end (233) of the body (23) of the spout (2), wherein the first (23a) and second (23b) body parts each contain a region of gradual diameter reduction from the lower end (232) to the upper end (233), a graduality of diameter reduction in the region of second (23b) body part being greater than that in the region of first (23a) body part.

7. The pouch assembly (100) according to claim 6, wherein the first body part (23a) has a length (L11) that is between 0.5 and 2 times the length (L12) of the second body part (23b) of the spout (2).

8. The pouch assembly (100) according to claim 1, wherein the wall (11) of the pouch (1) comprises a first part (112) that includes the opening (111) into which the base (21) of the spout (2) is integrated, this part being planar and obliquely arranged with respect to a horizontal plane (A) when the flexible pouch (1) is considered in an upright position.

9. The pouch assembly (100) according to claim 8, configured such that the spout is attached to the first part (112) of the wall (11), the first part disposed between adjacent second (113) and third (114) parts of the wall (11) wherein each of the first (112), second (113) and third (114) parts are oriented such that fictive planes contacting the outer surface of each of the first (112), second (113) and third (114) parts intersect to form a geometric space (34) wherein the body (23) of the spout (2) together with the cap (24) are contained within the geometric space (34).

10. The pouch assembly (100) according to claim 1, wherein the spout top end (22) is configured for coupling to a cap (24) for releasable closure of the spout (2).

11. The pouch assembly (100) according to claim 10, wherein the top end (22) of the spout (2) and the cap (24) are each provided with a co-operating screw thread (222, 241) for repeatable releasable attachment of the screw the cap (24) to the spout (2).

12. The pouch assembly (100) according to claim 10, wherein the cap (24) is provided with a tamper-evidence ring (242) which maintains connection with the cap (24) when the cap (24) is released from the spout (2).

13. The pouch assembly (100) according to claim 1, wherein the body (23) of the spout (2) is configured to extend completely into the tank filling neck during transfer of liquid to the liquid tank.

14. The pouch assembly (100) according to claim 1, wherein the body (23) has a length (L1) that is between 4 and 12 times the length (L2) of the base (21) of the spout (2).

15. A system for treating the exhaust gases of an internal combustion of a vehicle using a liquid being an aqueous urea solution, the system comprising
a liquid tank located in the vehicle, the liquid tank having a tank filling neck (3) for filling the liquid tank with the liquid from the outside of the liquid tank, and
a pouch assembly (100) according to claim 1.

16. The pouch assembly (100) according to claim 1, wherein the body (23) has a length (L1) that is between 2 and 6 times the length (L3) of the top end (22) of the spout (2).

* * * * *